Figure 1:
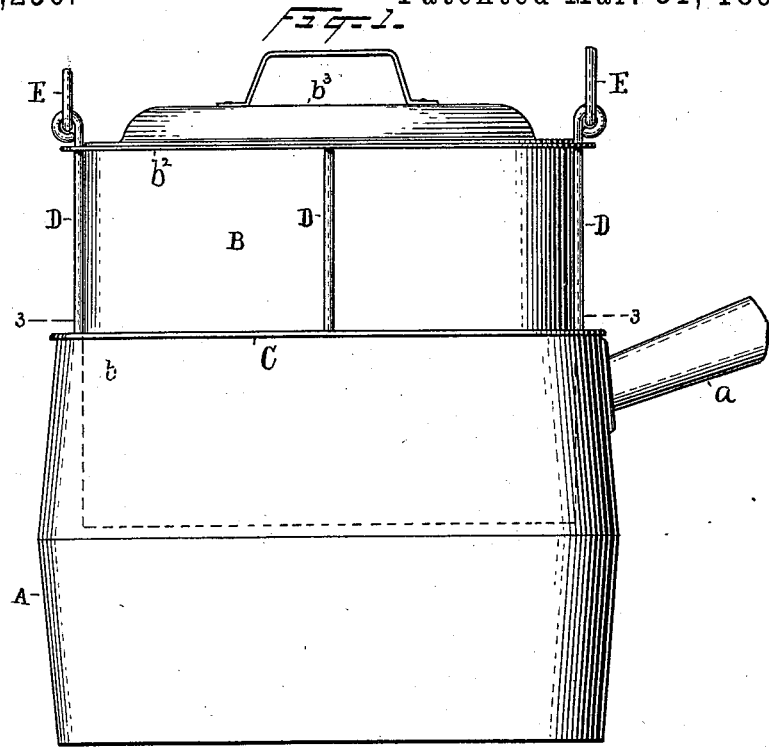

(No Model.) 2 Sheets—Sheet 1.

G. W. CROSS.
COOKING UTENSIL.

No. 557,256. Patented Mar. 31, 1896.

Witnesses
Norris A. Clark.
John R. Taylor.

Inventor
George W. Cross
By his Attorneys
Dyer & Driscoll (No Model.)  2 Sheets—Sheet 2.

G. W. CROSS.
COOKING UTENSIL.

No. 557,256. Patented Mar. 31, 1896.

Witnesses
Norris A. Clark.
John R. Taylor.

Inventor
George W. Cross
By his Attorneys
Dyer & Driscoll

UNITED STATES PATENT OFFICE.

GEORGE W. CROSS, OF PITTSTON, PENNSYLVANIA.

COOKING UTENSIL.

SPECIFICATION forming part of Letters Patent No. 557,256, dated March 31, 1896.

Application filed May 13, 1895. Serial No. 549,033. (No model.)

*To all whom it may concern:*

Be it known that I, GEORGE W. CROSS, a citizen of the United States, residing at Pittston, in the county of Luzerne, State of Pennsylvania, have invented a certain new and useful Improvement in Cooking Utensils, of which the following is a specification.

This invention relates to improvements in cooking utensils, and concerns more particularly utensils of the class named in which food is prepared for consumption by boiling or steaming. Many articles of food—such, for instance, as potatoes—are prepared by immersion in boiling water contained in a pot or kettle. When such articles have been sufficiently boiled, it is the common practice to pour off the water and then remove the food articles. This operation is time-consuming and awkward, and, especially when a large utensil is used, requires the expenditure of considerable strength. Again, many food articles require to be boiled for very accurate periods, and it is therefore important that means be provided for removing them from the water quickly, yet safely. Furthermore, it is often desirable after the food articles have been boiled to keep them warm until used, and for this purpose means should be employed which will not dry the articles or expel the moisture therefrom to too great extent.

The objects of the present invention are to provide a cooking utensil designed to contain water to be heated for the preparation of food and to provide means for immersing the food articles in the water in such utensil in such a manner that the burning of the food is precluded and its convenient removal from the utensil is secured.

A further object is to provide means of adjustment whereby the same apparatus may be employed as a steamer for the purpose of preparing food articles for consumption by steam generated by the boiling water in the utensil.

A further object of the adjustment referred to is to provide means whereby after the food articles have been prepared they may be kept warm and the drying of such articles, which would take place were they placed upon a stove or in an oven, as is often done, is provided against.

A further object of the construction and adjustment referred to is to provide means whereby when the food has been sufficiently boiled it may be removed from the boiling utensil in such manner as to permit the water to drain through the receptacle in which the food articles are contained and into the utensil in which such water was originally placed.

The invention is illustrated in the accompanying drawings, in which—

Figure 2:
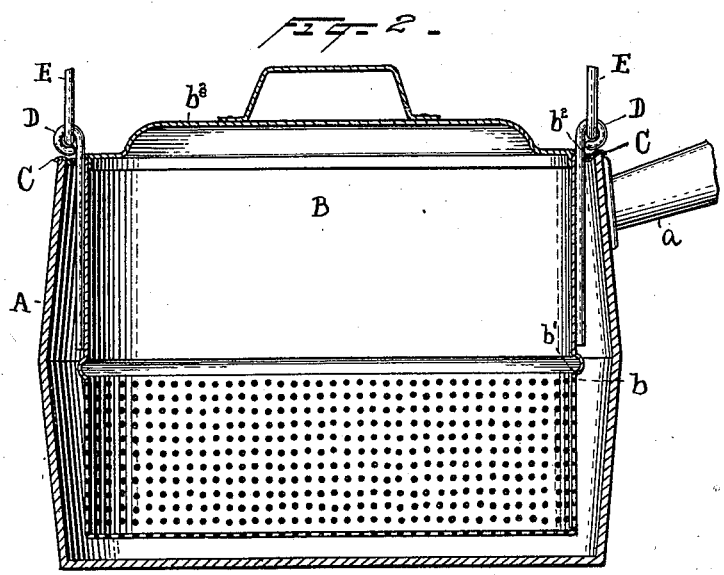
Figure 3:
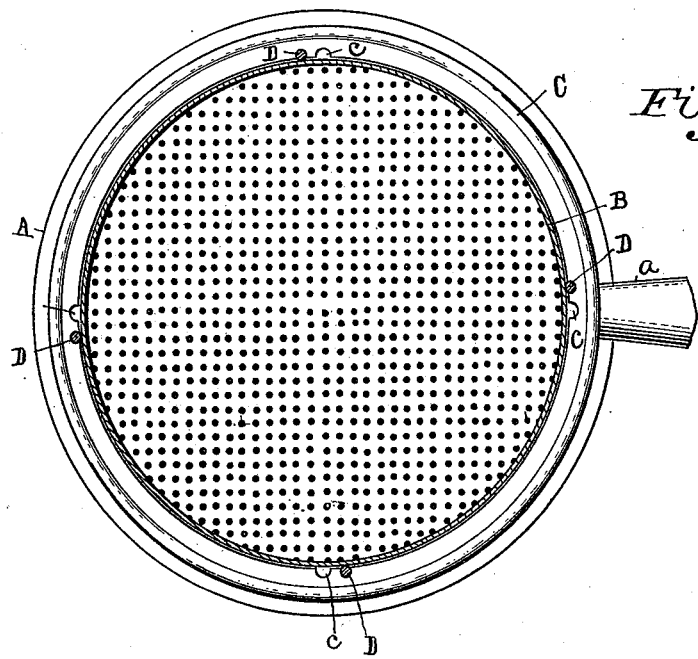
Figure 4:
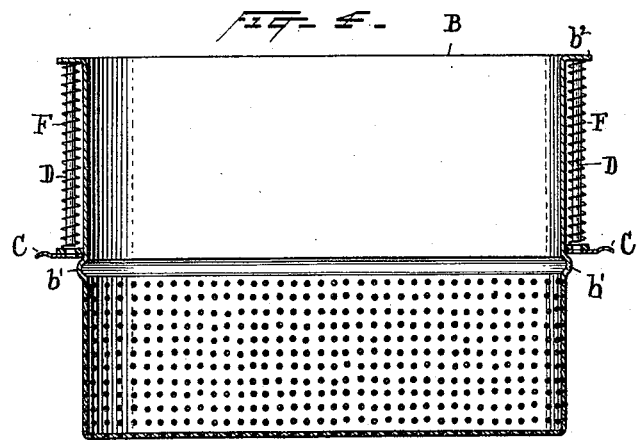

Figure 1 is a side elevation of the cooking utensil, the internal foraminated vessel hereinafter to be referred to being shown as elevated in such position as to lift the food articles above the level of the water. Fig. 2 is a central vertical section, the internal foraminated vessel being shown in its lowermost position. Fig. 3 is a horizontal section on the line 3 3 of Fig. 1; and Fig. 4 is a detail, hereinafter to be referred to, of the internal foraminated vessel.

Referring to the drawings, in which similar letters of reference denote corresponding parts, A designates a pot or kettle of any suitable construction and provided for convenience in handling with a handle *a*.

B designates a vessel designed to be placed within the pot or kettle A. This vessel is preferably made of tin or other suitable metal, and from its bottom up to the point *b*, which in the present instance I have shown about midway the height of the vessel, it is perforated or foraminated in order to permit free access to the interior of the vessel of the water in the pot or kettle A when the vessel B is in the position shown in Fig. 2 and of the steam arising from the water in said pot or kettle when the vessel B is in the position shown in Fig. 1. At the point *b* the vessel is provided with an outwardly-projecting bead *b'*, the purpose of which will be presently explained.

It is not essential that the lower portion of the vessel B be provided with perforations formed in the sheet metal of which the vessel is formed, as I may, if desired, form this portion of the vessel of woven wire, gauze, or similar suitable material.

The upper edge of the vessel B is provided with an outwardly-flaring portion or flange $b^2$, and is provided with a suitable cover $b^3$, preferably made of stamped sheet metal.

C designates an approximately flat ring or annulus fitting closely around the vessel B and extending outwardly sufficiently far to rest upon the upper edge of the pot or kettle A.

D D D D designate vertical rods or ribs secured in any suitable manner, preferably by solder, to the exterior of the vessel B. In the present instance four of these rods or ribs are shown, and two of them extend upwardly beyond the top of the vessel B, in order to form bearings for a bail E, by means of which the vessel B is adjusted in the pot or kettle. The annulus C is provided with recesses $c\ c\ c\ c$, with which the rods D are adapted to register when it is designed to place the vessel B within the pot or kettle in the position shown in Fig. 2. The rods D terminate, however, short of the annular bead $b'$, in order that when the vessel B is elevated in the position shown in Fig. 1 the lower ends of the rods will project above the annulus C in such manner as that the vessel B may be turned by means of the bail or other handle with which it is provided, so that the ends of the rods, instead of registering with the recesses $c$, will rest upon the annulus C and support the vessel thereon. The bead $b'$ acts to maintain the ring or annulus in position, and with said ring or annulus guards against the escape of steam from the utensil.

In the construction illustrated in Fig. 4 I have shown the guide-rods corresponding to the rods D, Figs. 1, 2, and 3, as secured to the foraminated vessel by means of their upper ends only, such ends being secured to the lower surface of the outwardly-flaring portion or flange. In this instance the rods, as in the construction above referred to, are designed to register with suitable recesses in the annulus C; but for the purpose of maintaining the relative position of the various parts and of retaining the annulus C in place upon the upper end of the pot or kettle coiled springs F are provided, surrounding the rods, the tops of such springs bearing against the under surface of the flange of the vessel and the bottoms of the springs being provided with a washer bearing upon the upper surface of the annulus C. As will be readily understood, when with this construction the vessel B is raised the springs F bearing upon the annulus C will maintain said annulus in its proper position, so that when the vessel B is elevated to the point where the annular bead comes in close proximity to the annulus C the vessel may be turned as before described, so as to permit the rods to bear upon the annulus C, and thereby support the vessel.

The operation of the construction above described is as follows: Sufficient water is placed within the pot or kettle A, so that when the vessel B containing the food articles is placed therein in the position shown in Fig. 2 the water will pass through the foramina in the vessel and will rise to a point a little below the line of the vessel B, when it is elevated to the position shown in Fig. 1. The food articles now being prepared are precluded from burning, for the reason that they do not come into contact with the pot or kettle being heated. When such articles have been sufficiently boiled, it is not necessary to remove the pot or kettle from the fire; but the vessel B is raised by means of the handle or bail E to the position shown in Fig. 1 and turned in a horizontal plane, in order that the lower ends of the rods D may rest upon the annulus C and thereby support the vessel B in the elevated position. If it is designed to keep the food warm after it has been boiled, it may be left in the vessel B when the latter is in the position last described, and, if desired, the vessel may be removed from the fire. The steam generated by the previously-heated water will of course rise and permeate the vessel B and the food contained therein, thereby keeping the same sufficiently warm and at the same time obviating the difficulty heretofore existing in the drying of the food and the exclusion of moisture, juices, &c., therefrom. If it is desired to remove the food articles entirely from the vessel, this may be accomplished by simply removing the cover $b^3$, or, if desired, the vessel B may be entirely removed from the pot or kettle, the cover $b^3$ taken off, and the food articles taken out in a suitable manner, it being understood that after having assumed the position shown in Fig. 1 the water theretofore contained in the vessel B will have drained therefrom into the pot or kettle.

When it is designed to use the utensil for the preparation of food articles by steam, the pot or kettle is, as before, filled with a suitable quantity of water, the level of such water being preferably a little below the bottom of the vessel B when it is in the position illustrated in Fig. 1. The vessel B is maintained in its elevated position and the food articles placed therein. The utensil may then be heated in the usual manner, and the steam rising from the water in the pot or kettle will, as heretofore described, rise and permeate the food contained within the vessel B, such waters of condensation as are formed within the vessel B quickly draining therefrom into the pot or kettle A.

I wish it to be understood that I do not limit myself to the specific construction herein shown and described, for obviously many changes in the details of the utensil may be made without departing from the principle of the invention. For instance, I may find it desirable to dispense with the rods D and to employ in lieu thereof vertical ribs or beads formed integral with or secured to the exterior of the vessel B, or I may dispense entirely with the springs F or employ in lieu thereof flat springs secured to the flange $b^2$ and bearing upon the annulus C. Again, the handles of both the pot or kettle A and the vessel B may be varied in form if desired.

What I claim is—

1. A cooking utensil comprising a pot or kettle, a ring or annulus at the upper end thereof, and provided with a series of recesses therein, a vertically-adjustable foraminated vessel having guide rods or ribs coacting with the recesses in said ring or annulus and serving to secure the vessel in position, two of said guide rods or ribs extending above said vessel and terminating in eyes, and a bail connecting said eyes, substantially as set forth.

2. A cooking utensil comprising a pot or kettle, a ring or annulus having recesses, a vertically-adjustable foraminated vessel having guide rods or ribs coacting with the recesses in said ring or annulus to secure the vessel in position, and springs between said ring or annulus and said vessel, substantially as described.

3. A cooking utensil comprising a pot or kettle, a ring or annulus having recesses, a vertically-adjustable foraminated vessel having guide rods or ribs coacting with the recesses in said ring or annulus to secure the vessel in position, and springs mounted on said guide rods or ribs and arranged between said ring or annulus and said vessel, substantially as set forth.

This specification signed and witnessed this 10th day of May, 1895.

GEORGE W. CROSS.

Witnesses:
 S. O. EDMONDS,
 JOHN R. TAYLOR.